US008935511B2

(12) United States Patent
Cardinell et al.

(10) Patent No.: US 8,935,511 B2
(45) Date of Patent: Jan. 13, 2015

(54) DETERMINING PROCESSOR OFFSETS TO SYNCHRONIZE PROCESSOR TIME VALUES

(75) Inventors: Charles S. Cardinell, Tucson, AZ (US); Bernhard Laubli, Tucson, AZ (US); Timothy J. Van Patten, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 973 days.

(21) Appl. No.: 12/902,047

(22) Filed: Oct. 11, 2010

(65) Prior Publication Data

US 2012/0089815 A1    Apr. 12, 2012

(51) Int. Cl.
*G06F 1/14* (2006.01)
*G06F 11/16* (2006.01)

(52) U.S. Cl.
CPC .............. *G06F 1/14* (2013.01); *G06F 11/1675* (2013.01)
USPC .......................................................... 712/31

(58) Field of Classification Search
CPC ............................... G06F 1/14; G06F 11/1675
USPC .......................................................... 712/31
See application file for complete search history.

(56) References Cited

U.S. PATENT DOCUMENTS

| | | | | |
|---|---|---|---|---|
| 7,058,838 B2 * | 6/2006 | Xu | ............................... | 713/400 |
| 7,340,630 B2 * | 3/2008 | Morris et al. | ................. | 713/400 |
| 7,453,910 B1 | 11/2008 | Biberstein et al. | | |
| 7,475,309 B2 | 1/2009 | Picano et al. | | |
| 2009/0158075 A1 | 6/2009 | Biberstein et al. | | |

FOREIGN PATENT DOCUMENTS

| | | |
|---|---|---|
| EP | 2 194 442 A1 | 10/2010 |
| JP | 2010102372 A | 6/2010 |
| WO | 2009043225 A1 | 4/2009 |
| WO | 2010025656 A1 | 3/2010 |

OTHER PUBLICATIONS

E. Mitchell, "Multi-core and Multi-threaded SoCs Present New Debugging Challenges", MIPS Technologies, Inc., Aug. 2003, pp. 1-6.
T. Riegel, et al., "Time-based Transactional Memory with Scalable Time Bases", ACM, 2007, pp. 1-9.
"Quick Integration of Multi-core Processors into HLR Platforms", Virtual Logix, 2008, pp. 1-4.
J. Sartori, et al., "Low-overhead, High-speed Multi-core Barrier Synchronization", University of Illinois, 2008-2009, pp. 1-15.
L. Chen, et al., TIB: Time Management Algorithm of PDES for Automatically Detecting Concurrency, IEEE, 2009, pp. 138-144.
English abstract of Japanese publication no. 2010102372A, published Jun. 5, 2010 for Toyota Motor Corp.
English machine translation of Japanese publication No. 2010102372A, published Jun. 5, 2010 for Toyota Motor Corp.

* cited by examiner

*Primary Examiner* — Andrew Caldwell
*Assistant Examiner* — Benjamin Geib
(74) *Attorney, Agent, or Firm* — David W. Victor; Konrad Raynes Davada & Victor LLP

(57) ABSTRACT

Provided are a computer program product, system, and method for determining processor offsets to synchronize processor time values. A determination is made of a master processor offset from one of a plurality of time values of the master processor and a time value of one of the slave processors. A determination is made of slave processor offsets, wherein each slave processor offset is determined from the master processor offset, one of the time values of the master processor, and a time value of the slave processor. A current time value of the master processor is adjusted by the master processor offset. A current time value of each of the slave processors is adjusted by the slave processor offset for the slave processor whose time value is being adjusted.

24 Claims, 4 Drawing Sheets

DETERMINING PROCESSOR OFFSETS TO SYNCHRONIZE PROCESSOR TIME VALUES

BACKGROUND OF THE INVENTION

1. Field of the Invention

The present invention relates to a computer program product, system, and method for determining processor offsets to synchronize processor time values.

2. Description of the Related Art

In a multi-core processor, multiple processors or cores are implemented on a single integrated circuit substrate, i.e., chip, and each processor core has registers, an L1 cache, and memory interface with a shared memory, such as an L2 cache. A common clock may provide clock signals to all the cores. The processor cores maintain time values in local registers that are incremented in response to the clock signal. However, the cores may not start at the same time and the time value at each processor core may differ. Certain applications may want the processor cores to have a synchronized time value.

Various prior art synchronization techniques pose problems in a multi-core environment. For instance, freezing the processor registers having the time values is problematic because there is the risk of an interrupt being generated while the time value registers are frozen. If an interrupt occurs, then all time related entries resulting from the interrupt operation will have the same time values even if the operations occur at different times. Further, while the time registers of the processors are frozen, a host adapter's time values will appear to move backwards in relation to externally connected agents, since the connected agents time values will still be advancing forward. Yet further, a master processor core registers cannot be rewound because the timeline of the master processor would appear to move backwards, including in relation to externally connected agents.

There is a need in the art for improved techniques to synchronize the time values maintained for the processor cores.

SUMMARY

Provided are a computer program product, system, and method for determining processor offsets to synchronize processor time values. A determination is made of a master processor offset from one of a plurality of time values of the master processor and a time value of one of the slave processors. A determination is made of slave processor offsets, wherein each slave processor offset is determined from the master processor offset, one of the time values of the master processor, and a time value of the slave processor. A current time value of the master processor is adjusted by the master processor offset. A current time value of each of the slave processors is adjusted by the slave processor offset for the slave processor whose time value is being adjusted.

DETAILED DESCRIPTION

Figure 1:
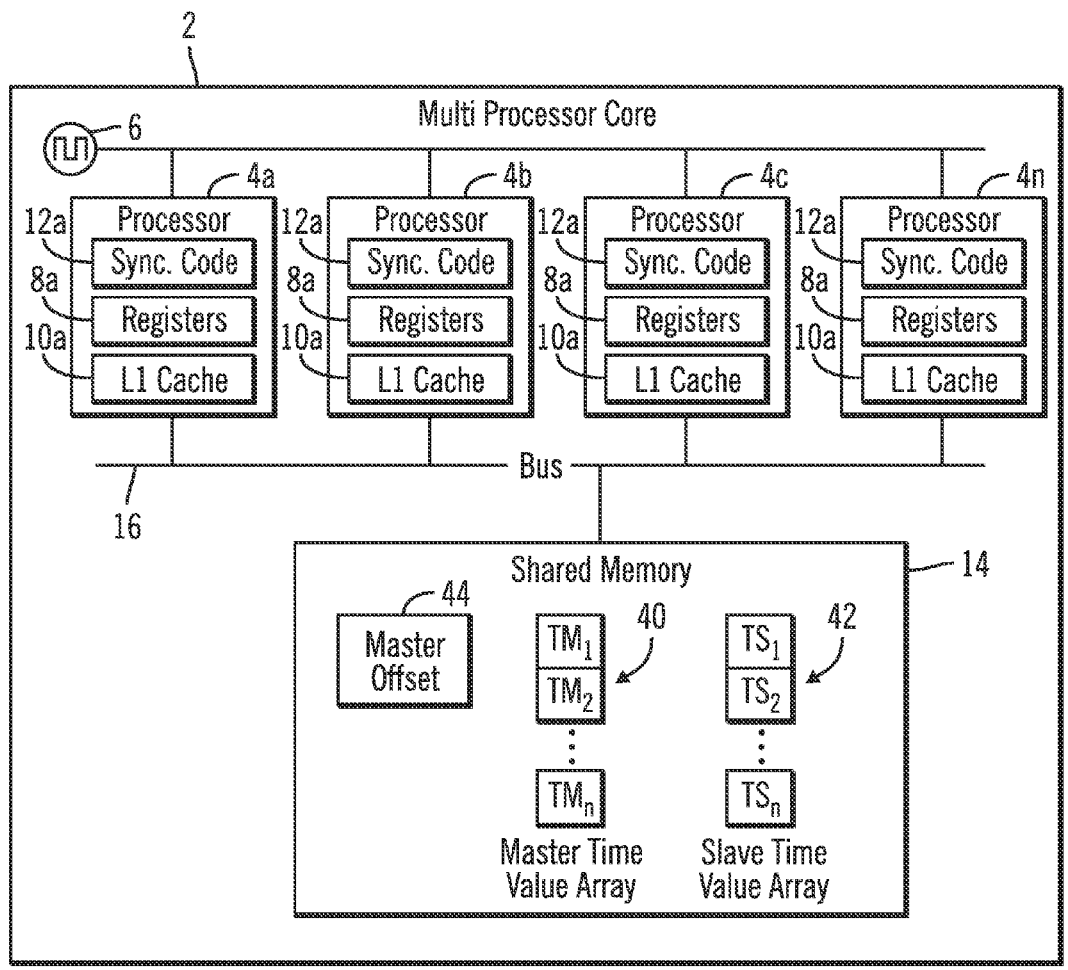
FIG. 1 illustrates an embodiment of a computing environment.

FIG. 1 illustrates an embodiment of a computing environment. A multi-core processor 2 is comprised of a plurality of processors 4a, 4b, 4c . . . 4n, each comprising an independent processor or core for separately executing instructions. In one embodiment, the processors 4a, 4b, 4c . . . 4n receive clock signals from a clock 6. All the processors 4a, 4b, 4c . . . 4n may simultaneously receive a clock signal from the clock 6 to simultaneously increment their individual time values. Each processor 4a, 4b, 4c . . . 4n includes registers 8a, 8b, 8c . . . 8n and an L1 cache 10a, 10b, 10c . . . 10n for storing values. The processors 4a, 4b, 4c . . . 4n may load synchronization code 12a, 12b, 12c . . . 12n, stored in non-volatile storage, into the L1 cache 10a, 10b, 10c . . . 10n to execute to perform synchronization of time values used by the processor 4a, 4b, 4c . . . 4n and maintained in the register 8a, 8b, 8c . . . 8n.

The processors 4a, 4b, 4c . . . 4n may access a shared memory 14, such as an L2 cache, over a bus 16. The processors 4a, 4b, 4c . . . 4n may use the shared memory 14 to communicate data. The bus 16 may comprise one or more bus interfaces implementing a memory bus used by the processors 4a, 4b, 4c . . . 4n to access the shared memory 14 and a communication bus for communication among the processors 4a, 4b, 4c . . . 4n.

In one embodiment, the processors 4a, 4b, 4c . . . 4n may comprise cores implemented on a single integrated circuit substrate, or chip. The shared memory 14 may be implemented on the same chip as the processors 4a, 4b, 4c . . . 4n, such as the case with an L2 cache, or implemented on an integrated circuit device external to the integrated circuit on which the processors 4a, 4b, 4c . . . 4n are implemented. In certain embodiments, the L1 and L2 cache may be located on the processor 4a, 4b, 4c . . . 4n chip, and the shared memory 14 comprises a further memory.

Figure 2:
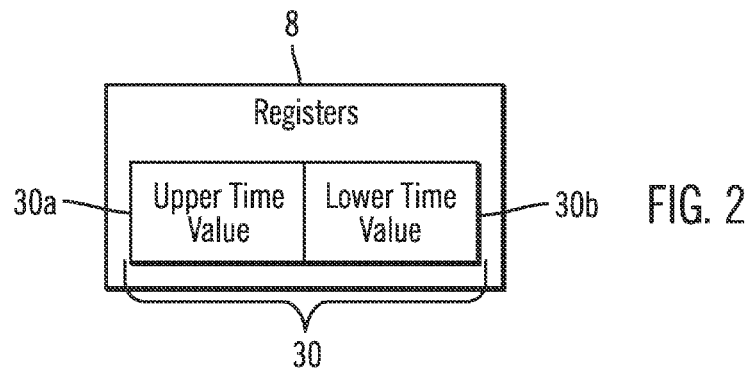
FIG. 2 illustrates an embodiment of a register having a time value.

FIG. 2 illustrates an embodiment of registers 8, comprising one of the registers 8a, 8b, 8c . . . 8n in the processors 4a, 4b, 4c . . . 4n, having a current time value 30 used by the processor 4a, 4b, 4c . . . 4n. In one embodiment, the current time value 30 is comprised of an upper time value 30a and a lower time value 30b. In one embodiment, the lower time value 30b is incremented in response to a signal from the clock and the upper time value 30a is incremented in response to incrementing through all the possible lower time values 30b, wherein the lower time value 30a wraps to a first time value, e.g., 0, after reaching a last time value, which causes the upper time value 30a to increment. In one embodiment, the lower time values 30a of the processors 4a, 4b, 4c . . . 4n may increment at the same time in response to receiving a clock 6 signal at the same time. However, the processors 4a, 4b, 4c . . . 4n may have different time values because they may begin operations at different times, causing their time values to be different and out-of-synchronization.

In an alternative embodiment, the time value 30 may comprise a single time value processed as a single unit, i.e., not having an upper and lower parts. Yet further, the time value may have more than two parts.

A master processor comprises one of the processors, e.g., processor 4a, that initiates an operation to synchronize time values 30 used by the processors 4a, 4b, 4c . . . 4n. Slave processors, e.g., processors 4b, 4c . . . 4n, comprise the processors that receive time information and signals from the master processor 4a to synchronize their time values. All processors 4a, 4b, 4c . . . 4n may include the same synchronization code 12a, 12b, 12c . . . 12n to enable each processor 4a, 4b, 4c . . . 4n to operate as a master or slave processor for time synchronization, depending on whether the processor 4a, 4b, 4c ... 4n is configured as a master or slave.

The processors 4a, 4b, 4c ... 4n may communicate via the shared memory 14, such as by writing values to the shared memory 14 so other processors may access. For instance, the master processor 4a may write master time values ($TM_1$ ... $TM_n$) at different times to a master time value array 40 and the slave processors 4b, 4c ... 4n may write slave time values ($TS_1$ ... $TS_n$) at different times. Each slave processor i writes one of the slave time values ($TS_i$), such that the slave processor i writes slave time value $TS_i$ to the ith entry in the slave time value array 42. The maser processor 4a may calculate a master offset 44 comprising an offset of the most advanced slave time value ($TS_i$) from the corresponding master time value ($TM_i$).

Figure 3:
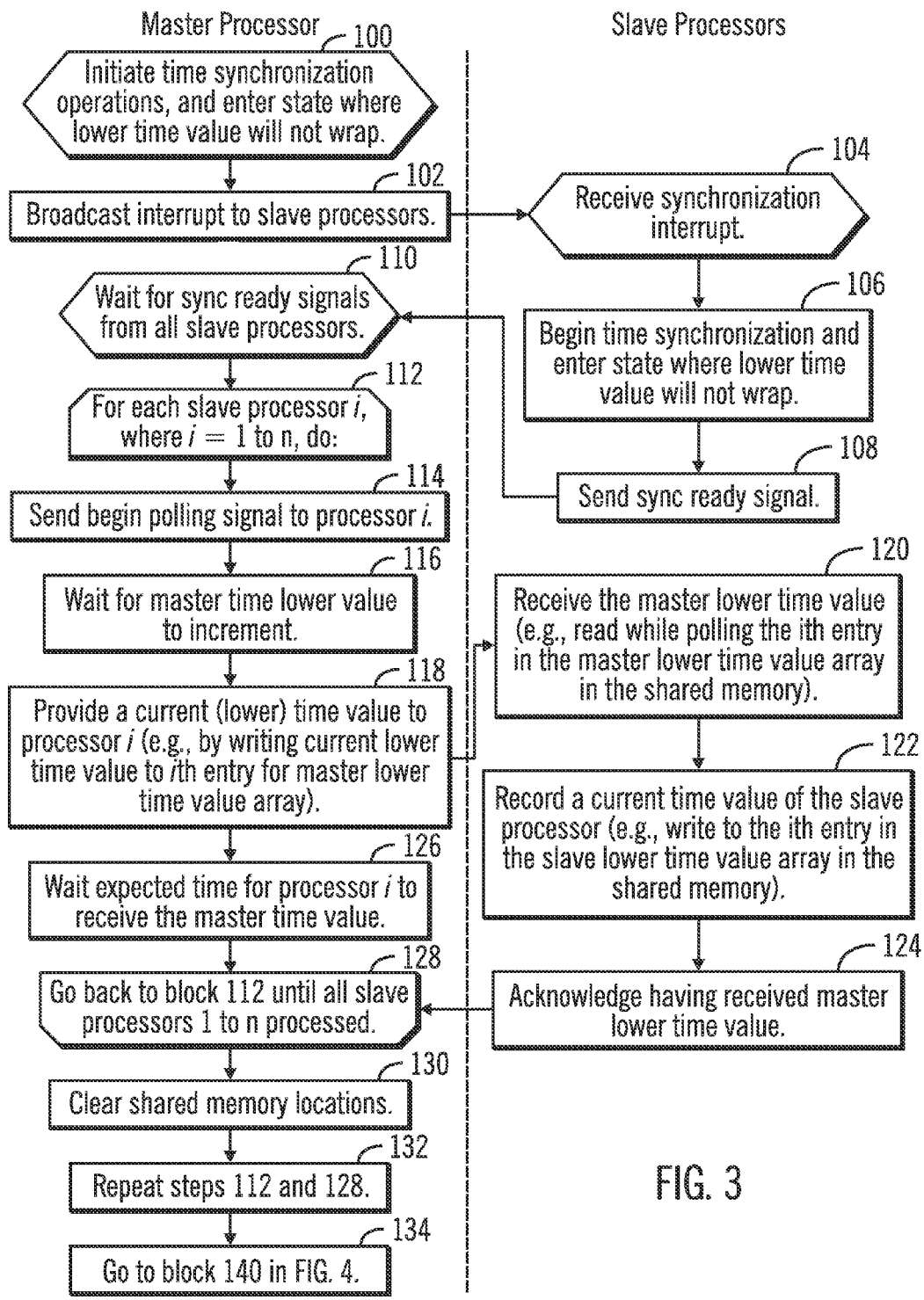
FIGS. 3 and 4 illustrate an embodiment of operations to synchronize the time values for a master processor and slave processors.
Figure 4:
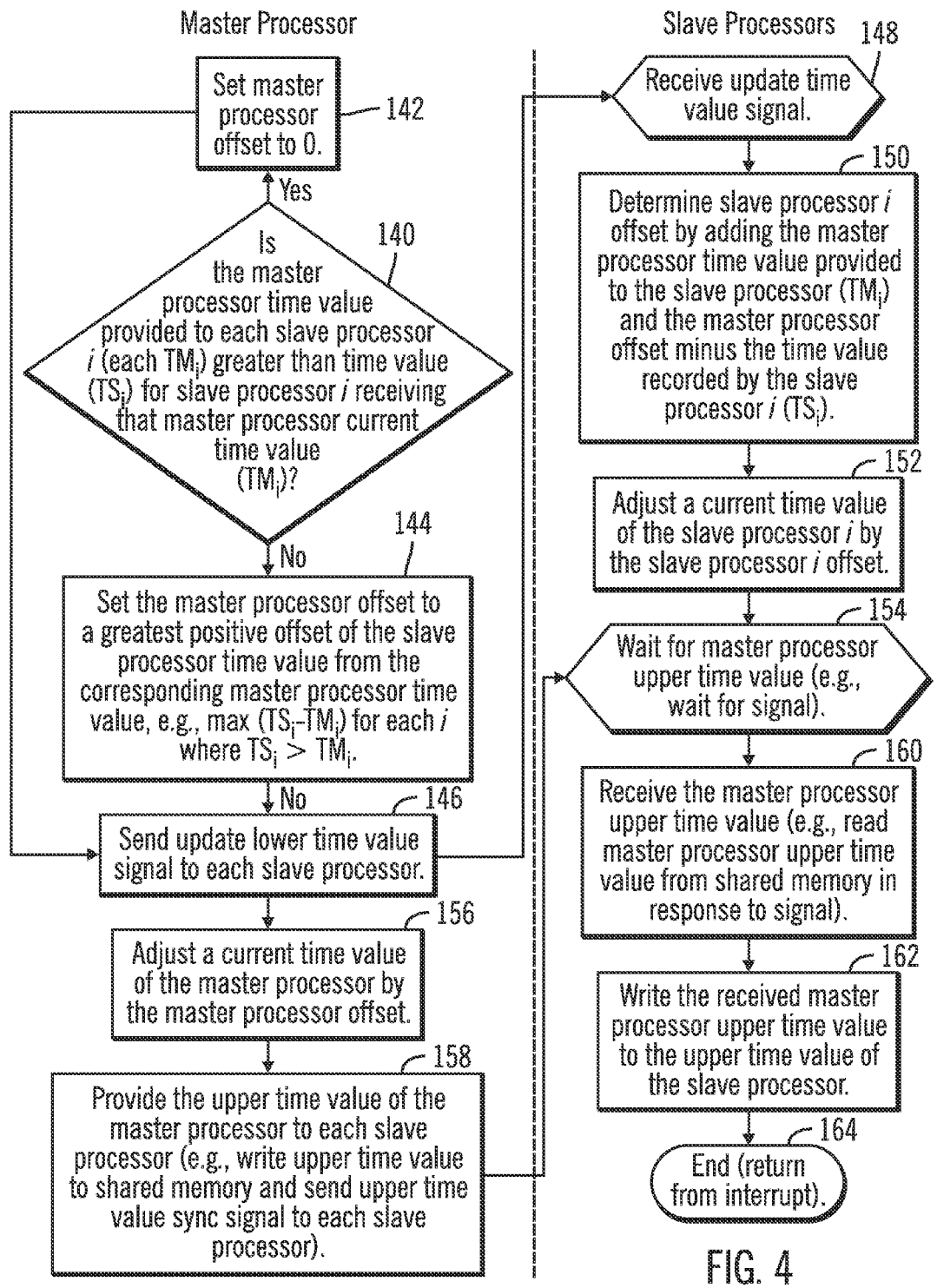

FIGS. 3 and 4 illustrate an embodiment of operations performed by the master and slave processors 4a, 4b, 4c ... 4n executing the synchronization code 12a, 12b, 12c ... 12n. The master processor, e.g., 4a, initiates the time synchronization operations (at block 100), which may involve initializing data structures, such as data structures 40, 42, and 44 in the shared memory 14, and entering a state where its time value 30, such as the lower time value 30b, does not wrap. The master processor 4a broadcasts (at block 102) a synchronization interrupt, such as an interprocessor interrupt (IPI), to the slave processors, e.g., 4b, 4c ... 4n. In response to receiving the IPI (at block 104), the slave processors 4b, 4c ... 4n begin (at block 106) time synchronization and enter a state where their time value 30, such as their lower time value 30b, will not wrap. After initializing for synchronization, the slave processors 4b, 4c ... 4n send (at block 108) a sync ready signal to the master processor 4a. In certain embodiments, if the master 4a and slave 4b, 4c ... 4n processors estimate that synchronization operations will not likely complete before the clock 6 causes the processor time value 30b to wrap, the processor 4a, 4b ... 4n may delay performing the synchronization. For instance, the slave processors 4a, 4b ... 4n may delay responding to the master processor 4a at block 108.

Upon receiving (at block 110) sync ready signals from all the slave processors 4b, 4c ... 4n, the master processor 4a performs operations at block 114 through 126 for each slave processor i, where there are 1 to n slave processors 4b, 4c ... 4n, where n may comprise any positive integer value. The master processor 4a sends (at block 114) a polling signal to processor i to cause processor i to poll the shared memory 14 for the lower time value 30b of the master processor 4a, which would be stored in the corresponding entry i of the master time value array 40. The master processor 4a waits (at block 116) for the lower time value 30b to increment and, in response, provides (at block 118) the current lower time value 30b ($TM_i$) to processor i. In certain embodiments, the master processor 4a provides the current master lower time value ($TM_i$) by writing the value to the entry i in the master time value array 40. In response, the processor i receives (at block 120) the master lower time value ($TM_i$). In certain embodiments, the processor i may receive the master lower time value ($TM_i$) by polling, in response to polling signal sent at block 114, the shared memory 14 location for the master time value ($TM_i$) in the ith entry of the master time value array 40 until the value in the ith entry is positive.

Upon receiving (at block 120) the master time value ($TM_i$), the slave processor i records (at block 122) a time value of the slave processor i, such as the current lower time value 30b ($TS_i$), in the shared memory 14. In one embodiment, the slave processor i may record by writing the current lower time value 30b ($TS_i$) to the ith entry in the slave time value array 42, which acknowledges that the lower time value ($TM_i$) of the master processor 4a was received. The slave processor i may return (at block 124) an acknowledgement of having received the master lower time value ($TM_i$). The master processor 4a may wait (at block 126) an expected time for the processor i to receive the master time value ($TM_i$) before proceeding (at block 128) back to block 112 to perform synchronization operations with respect to a next slave processor. After completing the operations at blocks 112-128 for all slave processors 4b, 4c ... 4n, the master processor may clear (at block 130) the shared memory locations 14 and then have the master processor 4a and slave processors 4b, 4c ... 4n repeat steps 112-130. In certain embodiments, the operations at blocks 112-128 are performed at least twice to ensure that all data structures and instructions, including the synchronization code 12a, 12b, 12c ... 12n to be executed by processors 4a, 4b, 4c ... 4n, reside in the L1 cache 10a, 10b, 10c ... 10n and registers 8a, 8b, 8c ... 8n to avoid any cache misses, and allow for the assumption that the time required to perform the steps 112-128 across the slave processors 4b, 4c ... 4n are performed in a deterministic and consistent manner across each invocation. Further, the operations of determining, for each slave processor i, the master processor time value ($TM_i$) and slave processor time value ($TS_i$), are performed at different times, i.e., at different clock 6 cycles.

After performing the operations twice (at block 132), the master processor 4a proceeds (at block 134) to block 140 in FIG. 4 to initiate operations to have the master determine a master processor offset 44 from the time values ($TM_1$ ... $TM_n$), e.g., lower time values 30b, of the master processor 4a and the time values ($TS_1$ ... $TS_n$) of the slave processors 4b, 4c ... 4n and have the slave processors 4b, 4c ... 4n determine slave processor offsets, where each slave processor i offset is determined from the master processor offset 44, the master processor time value ($TM_i$) and slave processor time value ($TS_i$).

If (at block 140) the master processor time value provided to each slave processor (each $TM_i$) is greater than the time value ($TS_i$) for the slave processor i receiving that master processor time value ($TM_i$), e.g., no slave processor time value is greater than the corresponding master processor time value, then the master processor 4a sets (at block 142) the master processor offset 44 to zero. Otherwise, if (at block 140) one slave processor i has a higher lower time value ($TS_i$) than the corresponding master processor lower time value ($TM_i$), then the master processor 4a sets (at block 144) the master processor offset 44 in the shared memory 14 to a greatest positive difference of the slave processor time value ($TS_i$) from the corresponding master processor time value ($TS_i$), e.g., maximum ($TS_i-TM_i$) for each i where $TS_i>TM_i$. In this way, the master processor 4a calculates an offset for a furthest advanced slave time value $TS_1$ ... $TS_n$. The master processor 4a sends (at block 146) an update lower time value signal to each slave processor 4b, 4c ... 4n to update their lower time values 30b.

Upon each processor i receiving (at block 148) the update time value signal, the slave processor i determines (at block 150) slave processor i offset by adding the master processor time value ($TM_i$) provided to the slave processor i and the master processor offset 44 minus the time value recorded by the slave processor i ($TS_i$), e.g., $TM_i$+master processor offset–$TS_i$. Each slave processor i adjusts (at block 152) a current time value of the slave processor i, which may comprise the current lower time value 30b in the register 8b, 8c ... 8n of the slave processor i, by the determined slave processor i offset. In embodiments where there is a separate upper time value 30a, the slave processors 4b, 4c ... 4n wait (at block 154) for the master processor upper time value 40b.

The master processor 4a adjusts (at block 156) a current time value of the master processor 4a, which may comprise the current lower time value 30b in the master register 8a, by the master processor offset 44. The master processor 4a provides (at block 158) the upper time value 30a of the master processor 4a to each slave processor 4b, 4c . . . 4n. In one embodiment, the master processor 4a may communicate its upper time value 30a by writing the master upper time value 30a to the shared memory 14 and send an upper time value sync signal to each slave processor to cause the slave processors 4b, 4c . . . 4n to read the master upper time value 30a written from the shared memory 14.

Each processor 4b, 4c . . . 4n receives (at block 160) the master processor upper time value 30b and writes (at block 162) the received master processor 4a upper time value to the upper time value 30a of the slave processor 4b, 4c . . . 4n in the slave register 8b, 8c . . . 8n. In one embodiment, the slave processors 4b, 4c . . . 4n read the master processor upper time value 30a from the shared memory 14 in response to the signal. After the time value is updated for each slave processor i, the slave processors 4b, 4c . . . 4n complete the time synchronization by returning from the interrupt.

In the described embodiments, the processors 4a, 4b, 4c . . . 4n share time values and the master offset 44 by writing their time values to the shared memory 14. In alternative embodiments, the processors 4a, 4b, 4c . . . 4n may share time values by direct communication of time values to one another. In the described embodiments, master 4a and slave 4b, 4c . . . 4n processors communicate in a manner such that synchronization operations take a consistent and deterministic amount of time.

Figure 5:
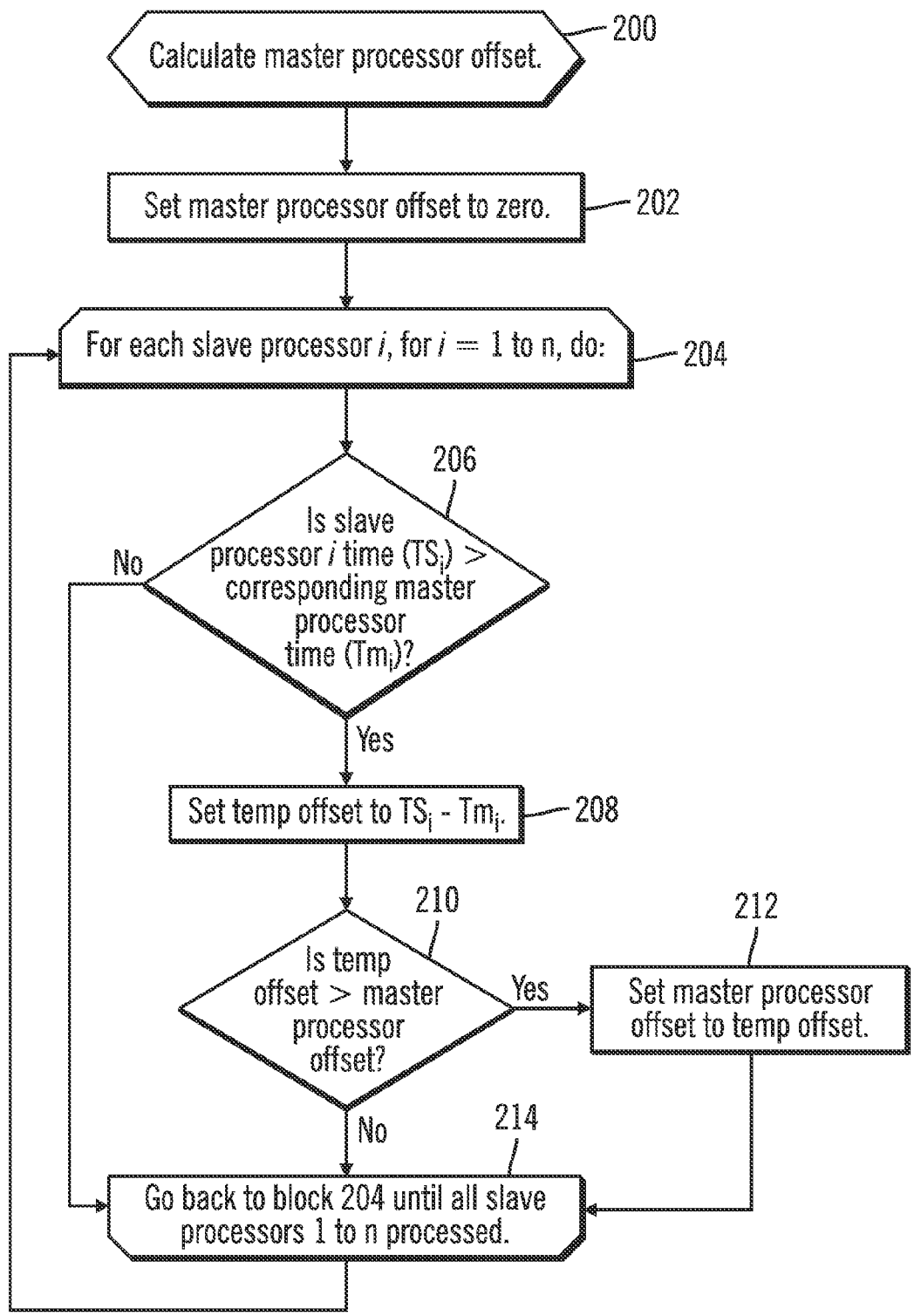
FIG. 5 illustrates an embodiment of operations to determine a master processor offset to use to calculate the master processor time value used to synchronize the processor time values.

FIG. 5 illustrates an embodiment of operations performed by the synchronization code 12a executed by the master processor 4a to calculate the master processor offset 44, such as performed at block 144 in FIG. 5. Upon initiating (at block 200) the operations to calculate the master processor offset, the master processor offset, which is maintained in registers 8a of the master processor 4 during the calculation, is set (at block 202) to zero. For each slave processor i, for i=1 to n slave processors 4b, 4c . . . 4n, the master processor 4a performs the operations at blocks 206-212. If (at block 206) the slave processor time i ($TS_i$) is greater than the corresponding master processor time ($TM_i$), a temporary offset ("temp offset") is set (at block 208) to the slave processor time ($TS_i$) minus the master processor time ($TM_i$). The master processor 4a may maintain the time values $TS_i$ and $TM_i$, stored in the master 40 and slave 42 time value arrays in the shared memory 14, and the master processor offset 44 in local registers 8b, 8c . . . 8n during calculation. If (at block 210) the temp offset is greater than the master processor offset 40, then the master processor offset 40 is set (at block 212) to the temp offset. If (from the no branch of block 206) the slave processor time $TS_i$ is less than or equal to the master processor time value $TM_i$ or if (from the no branch of block 210) the temp offset is not greater than the master processor offset 44, then control proceeds to consider the next slave processor until all slave processors 4b, 4c . . . 4n are considered.

With the described embodiments, a master processor and slave processors provide their time values to use to determine slave processor offsets to use to adjust the current processor time values according to consistent and deterministic operations. Further, the master processor and slave processor use the time values provided to determine slave processor offsets with which to adjust the current time values for the slave processors so as to synchronize the processors to a same time. In certain embodiments, the processor time registers may be synchronized in nanoseconds of each other and synchronized without freezing or rewinding the master processor time value by always incrementing the processor time values to synchronize.

Synchronization is useful for trace operations because synchronizing the processors allows the trace statements generated by each processor to be interleaved together to accurately show the execution of the entire system. Synchronization is further useful for state save operations because synchronizing the processors allows state save data to be time stamped to allow a user to determine when the core-specific data was collected relative to the system time. Synchronization is yet further needed for interprocessor heartbeat operations to prevent false interprocessor heartbeat timeouts.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 3-5 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer program product for synchronizing a time among a plurality of processors, the computer program product comprising a non-transitory computer readable storage medium having computer readable program code embodied therein that is executed by a master processor and a plurality of slave processors to perform operations, the operations comprising:

writing, by the master processor, master time values at different times to a shared memory;

writing, by the slave processors, slave time values at different times to the shared memory;

determining a master processor offset from one of a plurality of master time values and at least one of the slave time values in the shared memory;

determining slave processor offsets, wherein each slave processor offset is determined from the master processor offset, one of the master time values of the master processor, and one of the slave time values of the slave processor;

adjusting a current time value of the master processor by the master processor offset; and adjusting a current time value of each of the slave processors by the slave processor offset for the slave processor whose time value is being adjusted.

2. The computer program product of claim 1, wherein the master processor and the slave processors comprise cores on a single integrated circuit substrate, wherein the master processor and the slave processors receive clock signals from a clock on the substrate, wherein the master and the slave processors receiving the clock signals increment their time values at a same time in response to receiving the clock signals from the clock, and wherein the master processor and the slave processors communicate time values via the shared memory.

3. The computer program product of claim 1, wherein the operations further comprise:

determining, for each slave processor, a master processor time value and slave processor time value at different times.

4. The computer program product of claim 1, wherein the slave processor offset for each slave processor is calculated by performing:

providing, by the master processor, a time value of the master processor to the slave processor;

recording, by the slave processor, a time value of the slave processor in response to the master processor providing the master processor time value, wherein the master processor determines the master processor offset in response to all the slave processors recording their time values, and wherein the slave processor offsets are determined from the recorded slave processor time values and the master processor time values.

5. The computer program product of claim 4, wherein the operations of providing the time value of the master processor and recording the time value of the slave processor for each slave processor is performed a first time and a second time, and wherein the operations of determining the slave processor offsets, determining the master processor offset, and adjusting the current time values of the master processor and each of the slave processors are performed using the time values provided and recorded the second time.

6. The computer program product of claim 4, wherein each slave processor offset is determined by adding the master processor time value provided to the slave processor and the master processor offset minus the time value recorded by the slave processor, wherein different master processor time values are provided to the slave processors.

7. The computer program product of claim 4, wherein the operations further comprise:

setting the master processor offset to zero in response to determining that the master processor time value provided to each slave processor is greater than the slave processor time value for that slave processor receiving that master processor time value; and in response to determining that the master processor time value provided to at least one slave processor is less than the slave processor time value for that slave processor receiving that master processor time value, setting the master processor offset to a greatest positive offset of the slave processor time value from the master processor time value provided to the slave processor.

8. The computer program product of claim 1, wherein the master processor and the slave processors each maintain an upper time value and a lower time value, wherein the upper time value is incremented in response to the lower time value wrapping after incrementing through all possible lower time values, and wherein the time values used to calculate the slave processor offsets and the adjusted current time values comprise the lower time values of the master processor and the slave processors.

9. The computer program product of claim 8, wherein the operations further comprise:

providing, by the master processor, the upper time value of the master processor to the slave processors;

writing, by the slave processors the received master processor upper time value to the upper time values of the slave processors.

10. The computer program product of claim 8, wherein the operations further comprise:

initiating, by the master and slave processors, a state in which the master and slave processors will not wrap their lower time values during a synchronization process in which the current time values of the master processor and the slave processor are being adjusted.

11. A system, comprising:

a master processor;

a plurality of slave processors;

a shared memory;

at least one computer readable storage medium having code executed by the master and slave processors to perform operations, the operations comprising:

writing, by the master processor, master time values at different times to the shared memory;

writing, by the slave processors, slave time values at different times to the shared memory;

determining a master processor offset from one of a plurality of master time values and at least one of the slave time values in the shared memory;

determining slave processor offsets, wherein each slave processor offset is determined from the master processor offset, one of the master time values of the master processor, and one of the slave time values of the slave processor;

adjusting a current time value of the master processor by the master processor offset; and adjusting a current time value of each of the slave processors by the slave processor offset for the slave processor whose time value is being adjusted.

12. The system of claim 11, wherein the operations further comprise:

a single integrated circuit substrate including cores implementing the master processor and the slave processors comprise;

a clock on the substrate generating clock signals to the master processor and the slave processors, wherein the master and the slave processors receiving the clock signals increment their time values at a same time in response to receiving the clock signals from the clock; and wherein the shared memory is in communication with the master processor and the slave processors, wherein the master processor and the slave processors communicate time values via the shared memory.

13. The system of claim 11, wherein the operations further comprise:

determining, for each slave processor, a master processor time value and slave processor time value at different times.

14. The system of claim 11, wherein the slave processor offset for each slave processor is calculated by performing:

providing, by the master processor, a time value of the master processor to the slave processor;

recording, by the slave processor, a time value of the slave processor in response to the master processor providing the master processor time value, wherein the master processor determines the master processor offset in response to all the slave processors recording their time values, and wherein the slave processor offsets are determined from the recorded slave processor time values and the master processor time values.

15. The system of claim 14, wherein the operations of providing the time value of the master processor and recording the time value of the slave processor for each slave processor is performed a first time and a second time, and wherein the operations of determining the slave processor offsets, determining the master processor offset, and adjusting the current time values of the master processor and each of the slave processors are performed using the time values provided and recorded the second time.

16. The system of claim 11, wherein the master processor and the slave processors each maintain an upper time value and a lower time value, wherein the upper time value is incremented in response to the lower time value wrapping after incrementing through all possible lower time values, and wherein the time values used to calculate the slave processor offsets and the adjusted current time values comprise the lower time values of the master processor and the slave processors.

17. The system of claim 16, wherein the operations further comprise:

initiating, by the master and slave processors, a state in which the master and slave processors will not wrap their lower time values during a synchronization process in which the current time values of the master processor and the slave processor are being adjusted.

18. A method for synchronizing a time among a plurality of processors including a master processor and a plurality of slave processors, comprising:

writing, by the master processor, master time values at different times to a shared memory;

writing, by the slave processors, slave time values at different times to the shared memory;

determining a master processor offset from one of a plurality of master time values and at least one of the slave time values in the shared memory;

determining slave processor offsets, wherein each slave processor offset is determined from the master processor offset, one of the master time values of the master processor, and one of the slave time values of the slave processor;

adjusting a current time value of the master processor by the master processor offset; and adjusting a current time value of each of the slave processors by the slave processor offset for the slave processor whose time value is being adjusted.

19. The method of claim 18, wherein the master processor and the slave processors comprise cores on a single integrated circuit substrate, wherein the master processor and the slave processors receive clock signals from a clock on the substrate, wherein the master and the slave processors receiving the clock signals increment their time values at a same time in response to receiving the clock signals from the clock, and wherein the master processor and the slave processors communicate time values via the shared memory.

20. The method of claim 18, further comprising:

determining, for each slave processor, a master processor time value and slave processor time value at different times.

21. The method of claim 18, wherein the slave processor offset for each slave processor is calculated by performing:

providing, by the master processor, a time value of the master processor to the slave processor;

recording, by the slave processor, a time value of the slave processor in response to the master processor providing the master processor time value, wherein the master processor determines the master processor offset in response to all the slave processors recording their time values, and wherein the slave processor offsets are determined from the recorded slave processor time values and the master processor time values.

22. The method of claim 21, wherein the operations of providing the time value of the master processor and recording the time value of the slave processor for each slave processor is performed a first time and a second time, and wherein the operations of determining the slave processor offsets, determining the master processor offset, and adjusting the current time values of the master processor and each of the slave processors are performed using the time values provided and recorded the second time.

23. The method of claim 18, wherein the master processor and the slave processors each maintain an upper time value and a lower time value, wherein the upper time value is incremented in response to the lower time value wrapping after incrementing through all possible lower time values, and wherein the time values used to calculate the slave processor offsets and the adjusted current time values comprise the lower time values of the master processor and the slave processors.

24. The method of claim 23, further comprising:

initiating, by the master and slave processors, a state in which the master and slave processors will not wrap their lower time values during a synchronization process in which the current time values of the master processor and the slave processor are being adjusted.

* * * * *